(12) United States Patent
Yu

(10) Patent No.: US 8,970,960 B2
(45) Date of Patent: Mar. 3, 2015

(54) AUGMENTED REALITY HEAD GEAR

(71) Applicant: Mattel, Inc., El Segundo, CA (US)

(72) Inventor: Glenn Yu, San Marino, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 13/716,575

(22) Filed: Dec. 17, 2012

(65) Prior Publication Data

US 2013/0163090 A1 Jun. 27, 2013

Related U.S. Application Data

(60) Provisional application No. 61/579,169, filed on Dec. 22, 2011.

(51) Int. Cl.

| | | |
|---|---|---|
| *G02B 27/14* | (2006.01) | |
| *G02B 27/22* | (2006.01) | |
| *G09G 5/00* | (2006.01) | |
| *G03B 21/00* | (2006.01) | |
| *H04N 7/00* | (2011.01) | |
| *G02B 27/01* | (2006.01) | |
| *G06F 3/01* | (2006.01) | |
| *A63F 13/98* | (2014.01) | |
| *A63F 13/20* | (2014.01) | |
| *A63F 13/40* | (2014.01) | |
| *A63F 13/00* | (2014.01) | |

(52) U.S. Cl.
CPC ............ *G02B 27/0176* (2013.01); *G06F 3/011* (2013.01); *G02B 27/017* (2013.01); *A63F 13/02* (2013.01); *A63F 13/06* (2013.01); *A63F 13/10* (2013.01); *G02B 2027/0138* (2013.01); *G02B 2027/014* (2013.01); *A63F 13/00* (2013.01); *A63F 2300/203* (2013.01); *A63F 2300/308* (2013.01); *A63F 2300/69* (2013.01); *A63F 2300/8082* (2013.01)
USPC ............ 359/630; 359/466; 359/629; 353/11; 348/115

(58) Field of Classification Search
USPC ............ 359/13–14, 404, 409–410, 462, 466, 359/603–639, 407; 345/7, 9; 348/115; 353/11–12, 28, 119; 340/438, 980, 340/995.1, 815.47, 815.74
See application file for complete search history.

(56) References Cited

U.S. PATENT DOCUMENTS

| | | |
|---|---|---|
| 3,414,347 A | 12/1968 | Stoltze |
| 3,572,931 A | 3/1971 | Adler |
| 3,741,634 A | 6/1973 | Stoltze |
| 3,787,113 A | 1/1974 | Shedrow |
| 3,990,788 A | 11/1976 | Choy |
| 4,196,981 A | 4/1980 | Waldrop |
| 4,400,067 A | 8/1983 | Joffe |
| 4,429,959 A | 2/1984 | Walters |
| 4,439,755 A * | 3/1984 | LaRussa ...................... 340/980 |
| 4,511,226 A | 4/1985 | Freeman |

(Continued)

*Primary Examiner* — Dawayne A Pinkney
(74) *Attorney, Agent, or Firm* — Edell, Shapiro & Finnan, LLC

(57) ABSTRACT

An augmented reality electronic head gear is disclosed. The head gear includes an electronic device compartment configured to receive and support an electronic device such as an iPhone®. The head gear further includes a reflective surface configured to reflect the display of the electronic device to the eyes of a user. The head set is configured to rest upon a user's head, keeping the user's hands free and able to interact with the surrounding environment, while the user's eyes view real-time images of the surrounding environment being augmented.

18 Claims, 20 Drawing Sheets

(56) References Cited

U.S. PATENT DOCUMENTS

| | | | |
|---|---|---|---|
| 4,740,069 A | 4/1988 | Baum | |
| 4,810,081 A | 3/1989 | Mapelli et al. | |
| 4,925,270 A | 5/1990 | Eckmann | |
| RE33,311 E | 8/1990 | Wilkins | |
| 5,100,224 A | 3/1992 | Terrasi | |
| 5,349,392 A | 9/1994 | Buffet | |
| 5,493,348 A | 2/1996 | Herald, Jr. et al. | |
| 5,657,106 A | 8/1997 | Herald, Jr. et al. | |
| 5,682,173 A * | 10/1997 | Holakovszky et al. | 345/8 |
| 5,929,963 A | 7/1999 | McNeal | |
| 6,011,653 A * | 1/2000 | Karasawa | 359/630 |
| 6,168,278 B1 | 1/2001 | Mukai | |
| 6,230,328 B1 | 5/2001 | Holloway | |
| 6,386,703 B1 | 5/2002 | Huang | |
| 6,408,257 B1 | 6/2002 | Harrington et al. | |
| 6,450,638 B1 | 9/2002 | De Lima | |
| 6,474,811 B2 | 11/2002 | Liu | |
| 6,488,373 B1 | 12/2002 | Feinbloom et al. | |
| 6,502,937 B2 | 1/2003 | Yang | |
| 6,637,878 B2 | 10/2003 | Huang | |
| 6,764,175 B1 | 7/2004 | Chen | |
| 6,774,869 B2 | 8/2004 | Biocca et al. | |
| 6,783,234 B1 | 8/2004 | Hong | |
| 6,827,437 B1 | 12/2004 | Kim | |
| 6,848,784 B1 | 2/2005 | Park | |
| 6,848,785 B1 | 2/2005 | Spillman | |
| 6,939,003 B2 | 9/2005 | Kidouchim | |
| 6,971,744 B1 | 12/2005 | Cummings | |
| 6,997,551 B2 | 2/2006 | James | |
| 7,033,018 B2 | 4/2006 | Ifergan | |
| 7,040,750 B2 | 5/2006 | Smith et al. | |
| 7,055,951 B2 | 6/2006 | Canavan et al. | |
| 7,063,419 B1 | 6/2006 | Munakata et al. | |
| 7,070,271 B2 | 7/2006 | Park | |
| 7,114,806 B2 | 10/2006 | Dietz | |
| 7,131,726 B2 | 11/2006 | Hiramoto | |
| 7,175,275 B2 | 2/2007 | Ifergan | |
| 7,192,134 B2 | 3/2007 | Teng | |
| 7,204,589 B2 | 4/2007 | Pieterman | |
| 7,229,168 B2 | 6/2007 | Kidouchim | |
| 7,229,170 B2 | 6/2007 | Xiao | |
| 7,275,821 B2 | 10/2007 | Yu | |
| 7,364,287 B2 | 4/2008 | Lee et al. | |
| 7,390,086 B2 | 6/2008 | Lee | |
| 7,396,124 B1 | 7/2008 | Wang | |
| 7,431,453 B2 | 10/2008 | Hogan | |
| 7,461,935 B2 | 12/2008 | Collier et al. | |
| 7,494,219 B2 | 2/2009 | Shahkarami | |
| 7,527,373 B2 | 5/2009 | Stanley et al. | |
| 7,540,606 B2 | 6/2009 | Huang | |
| 7,648,233 B2 | 1/2010 | Blanshay et al. | |
| 7,695,132 B2 | 4/2010 | Yoshida et al. | |
| 2002/0053101 A1 | 5/2002 | Slack | |
| 2002/0071088 A1 | 6/2002 | Cardenas | |
| 2002/0093622 A1 | 7/2002 | Tostado | |
| 2005/0099591 A1 | 5/2005 | Ifergan | |
| 2005/0140573 A1 | 6/2005 | Riser et al. | |
| 2005/0225714 A1 | 10/2005 | Thir | |
| 2006/0044265 A1 | 3/2006 | Min | |
| 2007/0052919 A1 | 3/2007 | Antognazza et al. | |
| 2007/0069976 A1 | 3/2007 | Willins et al. | |
| 2007/0220108 A1 | 9/2007 | Whitaker | |
| 2007/0273983 A1 | 11/2007 | Hebert | |
| 2008/0239080 A1 | 10/2008 | Moscato | |
| 2009/0046140 A1 | 2/2009 | Lashmet et al. | |
| 2009/0060473 A1 | 3/2009 | Kohte et al. | |
| 2009/0073376 A1 | 3/2009 | Swift | |
| 2009/0099836 A1 | 4/2009 | Jacobsen et al. | |
| 2010/0045569 A1 | 2/2010 | Estevez et al. | |
| 2010/0079356 A1 | 4/2010 | Hoellwarth | |
| 2010/0121480 A1 | 5/2010 | Stelzer et al. | |
| 2010/0199232 A1 | 8/2010 | Mistry et al. | |
| 2010/0254017 A1 | 10/2010 | Martins | |
| 2010/0257252 A1 | 10/2010 | Dougherty et al. | |
| 2010/0260494 A1 * | 10/2010 | Sutton et al. | 396/268 |
| 2011/0009164 A1 | 1/2011 | Amiri | |
| 2011/0018903 A1 | 1/2011 | Lapstun et al. | |
| 2011/0109871 A1 | 5/2011 | Chiou | |
| 2011/0165917 A1 | 7/2011 | Taylor | |
| 2011/0169928 A1 | 7/2011 | Gassel et al. | |
| 2011/0214082 A1 | 9/2011 | Osterhout et al. | |

\* cited by examiner

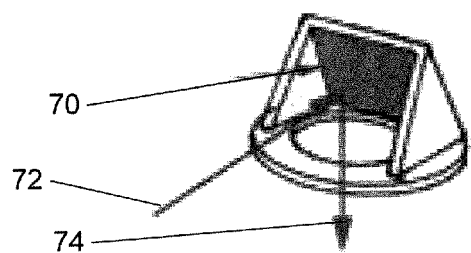
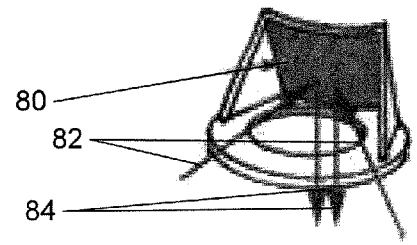
FIG. 4     FIG. 5
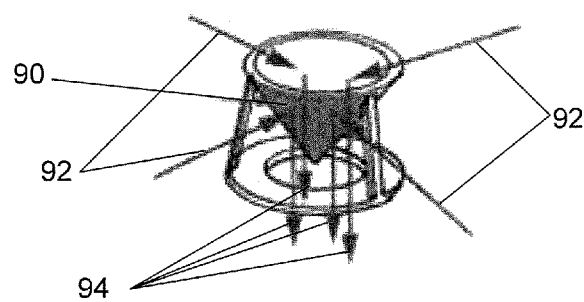
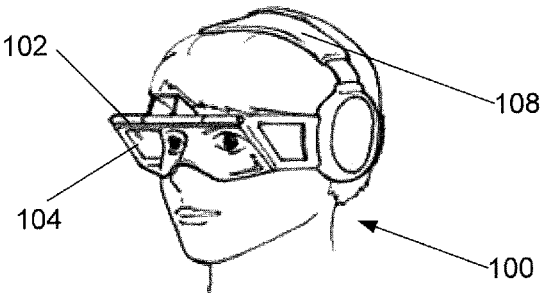
FIG. 6     FIG. 7
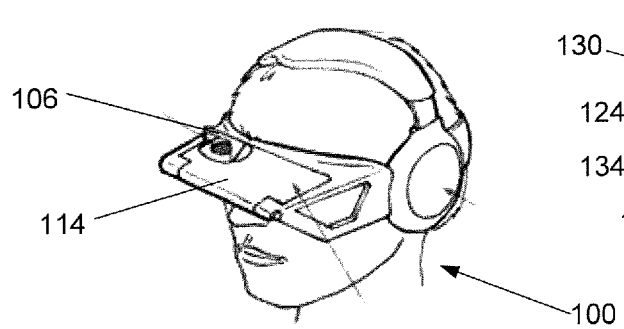
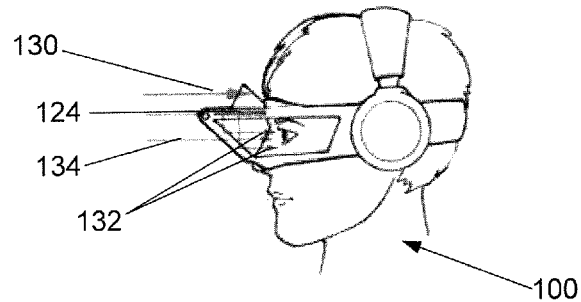
FIG. 8     FIG. 9

AUGMENTED REALITY HEAD GEAR

CROSS-REFERENCE TO RELATED APPLICATION

This application claims priority to and the benefit of U.S. Provisional Patent Application No. 61/579,169, filed Dec. 22, 2011, Attorney Docket No. 1389.0351P/17042P, entitled "Augmented Reality Head Gear," the entire disclosure of which is incorporated herein by reference in its entirety.

FIELD OF THE INVENTION

The present invention relates to a head set that allows for the interaction with an electronic device to enhance the user's surrounding environment as viewed through the electronic device.

BACKGROUND OF THE INVENTION

Children use their imagination when playing with a variety of toys such as figurines, cars, planes, toy guns, among many others. Many of these toys are limited in their capabilities, leaving the children to use their imagination to have their toys perform functions, such as a toy fighter jet firing a missile. Moreover, many toys that do perform functions contain a multitude of parts that can be easily misplaced or lost, leaving that toy incapable of performing its original functions.

Furthermore, oftentimes when children play with one another, they imagine themselves and their friends as characters of their favorite movie, or wearing costumes for the game or activity they are playing together. For example, if the children were imagining themselves being knights in shining armor, they would imagine each other wearing armored suits. With the variety of characters and themes in the games children play, purchasing costumes for each character or to accompany the theme would become costly.

Therefore, there is a need for an augmentation device that enhances children's interactions with each other and with their toys, by reducing the need for the children to imagine toys performing functions, costume outfits, or even environmental surroundings, while leaving the hands of the children free to interact with toys. The augmentation device head gear provides a digital alteration of the environment surrounding a user, of the toy the user is playing with, and/or of another person, all while leaving the hands of the user free.

SUMMARY OF THE INVENTION

The present invention is directed to an augmented reality head set. In one embodiment, head set includes a compartment that receives an electronic device that includes image capturing capabilities and augmenting programming, a reflective surface configured to reflect the augmented image to a user, and a head strap or component for securing the head set to the head of a user. The head set, in combination with the augmentation device, enhances a user's experience with toys and other users of the head set. Once activated, the augmented reality head set allows for interaction with the augmented display that is created from the real-time images captured by the augmentation device.

In one embodiment, a head set for augmenting the surrounding environment comprises a frame having opposed first and second sides, and opposed top and bottom sides connecting the first side to the second side, an electronic compartment disposed on the top of the frame, a reflective surface disposed on the frame below the electronic compartment, a first ear member extending rearwardly from the first side of the frame, and a second ear member extending rearwardly from the second side of the frame.

In another embodiment, the head set includes an electronic compartment that positions an electronic device to project the display of the electronic device below on the reflective surface.

In another embodiment, the head set includes the reflective surface being angled to reflect the display of the electronic device rearwardly.

In another embodiment, the head includes the reflective surface having a half-mirrored surface, enabling a user to at least partially view objects through the reflective surface.

In another embodiment, the head comprises a camera hood disposed on the electronic compartment. In addition, the camera hood includes a mirrored surface enabling the camera of an electronic device to capture images of objects placed in front of the head set.

In another embodiment, the head set comprises a retaining strap connected to the frame of the head set.

In an alternative embodiment, a head set for augmenting the surrounding environment comprises a compartment having a top side, a bottom side, a first side, and a second side opposite the first side, a first member extending rearwardly from the first side of the compartment, a second member extending rearwardly from the second side of the compartment, and a reflective surface disposed between the first and second sides and below the compartment, wherein the reflective surface is angled to rearwardly reflect an image from the compartment and the compartment is configured to receive an electronic device with image capturing capabilities.

In another embodiment, the head set comprises a head band connected between the first member and the second member.

In another embodiment, the head set includes the compartment positioning an electronic device to project the display of the electronic device onto the reflective surface.

In another embodiment, the head set includes the reflective surface being a half-mirrored surface, enabling a user to at least partially view objects through the reflective surface.

In another embodiment, the head set comprises a camera hood disposed on the top of the compartment. In addition, the camera hood includes a mirrored surface to enable a camera of an electronic device to capture images of objects placed in front of the head set.

In another embodiment, a head set for augmenting the surrounding physical environment comprises a compartment configured to receive an electronic device that augments and displays the surrounding physical environment, a reflective surface disposed below the compartment and configured to reflect the augmented surrounding physical environment, a face pad with a first eye member and a second eye member configured to receive a user's face and direct a user's view towards the reflective surface, and a head strap or mounting component, wherein the reflective surface is configured at an angle with respect to the compartment to reflect the augmented surrounding physical environment through the first and second eye members of the face pad.

In another embodiment, the head set comprises at least one camera hood disposed on the compartment and configured to direct the image capturing device of the electronic device to the surrounding physical environment. In addition, the at least one camera hood includes a minor positioned within.

In another embodiment, the head set includes the reflective surface as a half-mirrored surface.

In another embodiment, the head set comprises a trigger mechanism configured to the compartment to trigger augmentation of the surrounding physical environment.

In another embodiment, the compartment of the head set comprises a door hingedly connected to the compartment.

In another embodiment, the head set includes the reflective surface being hingedly connected to the compartment to configure an optimum reflecting angle.

BRIEF DESCRIPTION OF THE DRAWINGS

FIG. 4 illustrates a perspective view of an embodiment of a camera hood and minor for the head gear according to the present invention.

FIG. 5 illustrates a perspective view of another embodiment of the camera hood and mirror for the head gear.

FIG. 6 illustrates a perspective view of another embodiment of the camera hood and mirror for the head gear.

FIG. 7 illustrates a perspective view of a first embodiment of the head gear according to the present invention positioned on a user's head.

FIG. 8 illustrates a top perspective view of the head gear illustrated in FIG. 7.

FIG. 9 illustrates a side view of the head gear illustrated in FIG. 7.

Like reference numerals have been used to identify like elements throughout this disclosure.

DETAILED DESCRIPTION OF THE INVENTION

An augmented reality head set according to the present invention includes a compartment for housing an electronic device capable of capturing an image and a reflective surface for relaying the image from the electronic device. In one embodiment, the electronic device is an Apple® iPhone®. In other embodiments, the device is another smart phone with a built in camera, or another electronic device that includes the feature of a camera or image/video capturing device. In one embodiment, the head set includes a head strap or other component for securing the head set to a user's head. In another embodiment, the head set uses two elongated stems or temples to secure the head set to a users head in a similar manner to that of glasses. In one embodiment, both the compartment and the reflective surface are pivotable to tweak an optimum angle for reflecting the display of the electronic device into a user's eyes.

Figure 1:
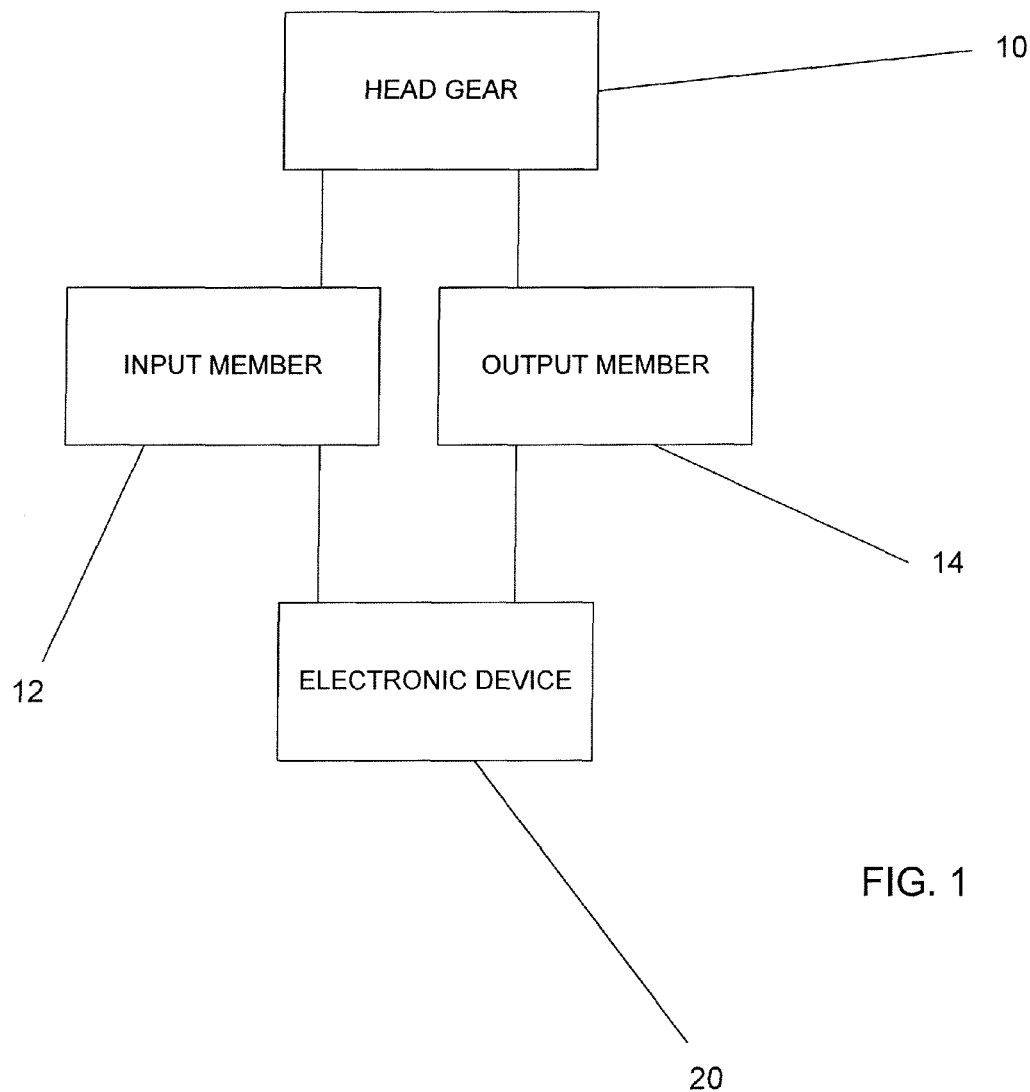
FIG. 1 illustrates a schematic block diagram of an embodiment of an augmented reality head gear product according to the present invention.

Referring to FIG. 1, a schematic block diagram of an embodiment of an augmented reality head gear system according to the present invention is illustrated. Head gear 10 includes an input member 12 and an output member 14. Input member 12 and output member 14 interact with an electronic device 20 to develop an augmented display. Electronic device 20 communicates with input member 12 to capture real-time images/video from the surrounding environment. Electronic device 20 then augments the real-time images and communicates with the output member 14 to display the augmented image to the user of the head gear 10.

Figure 2:
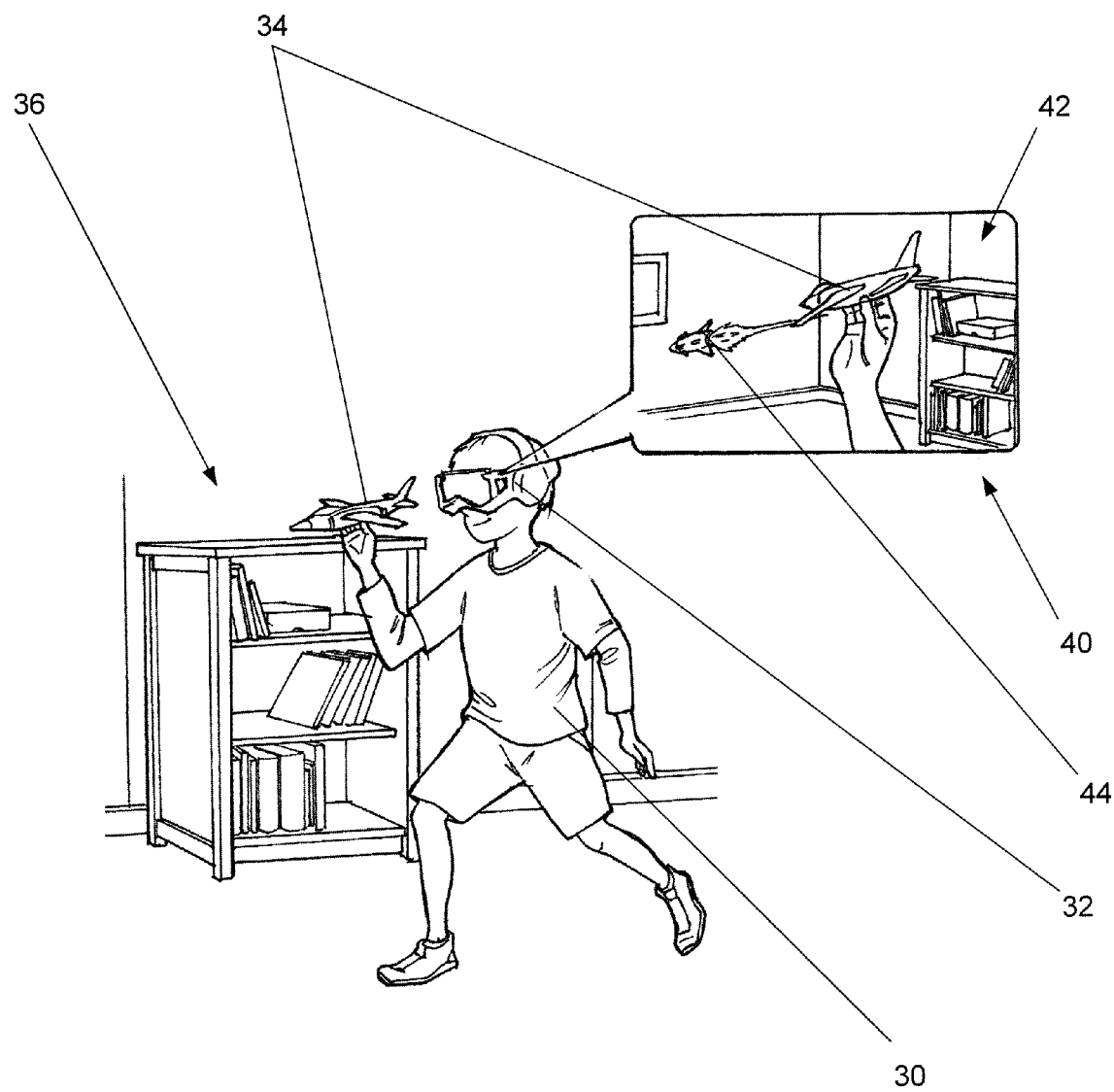
FIG. 2 illustrates one embodiment of the augmented reality head gear product in use in an environment according to the present invention.

Referring to FIG. 2, one embodiment of head gear 32 being used by a user 30 is illustrated. As shown, user 30 is wearing head gear 32 while playing with an object 34 in an environment 36. Image 40 is the view that the user 30 sees within the head gear 32. The object 34 that user 30 is playing with in the environment 36 is also seen as the same object 34 within the image 40. The environment 36 that user 30 is playing within is also seen through the image 40 and the environment 42 created by the head gear 32. Augmented portion 44 is an enhancement viewable in image 40 of the head gear 32 that is provided to the object 34 and environment 36, and associated with the object 34.

Furthermore, in this embodiment, user 30 is playing with object 34, which is a toy fighter jet. Without viewing the fighter jet (object 34) through the head gear 32, the user does not see the augmented portion 44, which is a missile in this embodiment. When the user 30 views the fighter jet (object 34) through the head gear 32, the user 30 sees the image 40 with the fighter jet (object 34) launching a missile (augmented portion 44), making the user's 30 interaction with the object 34 more entertaining.

Figure 3:
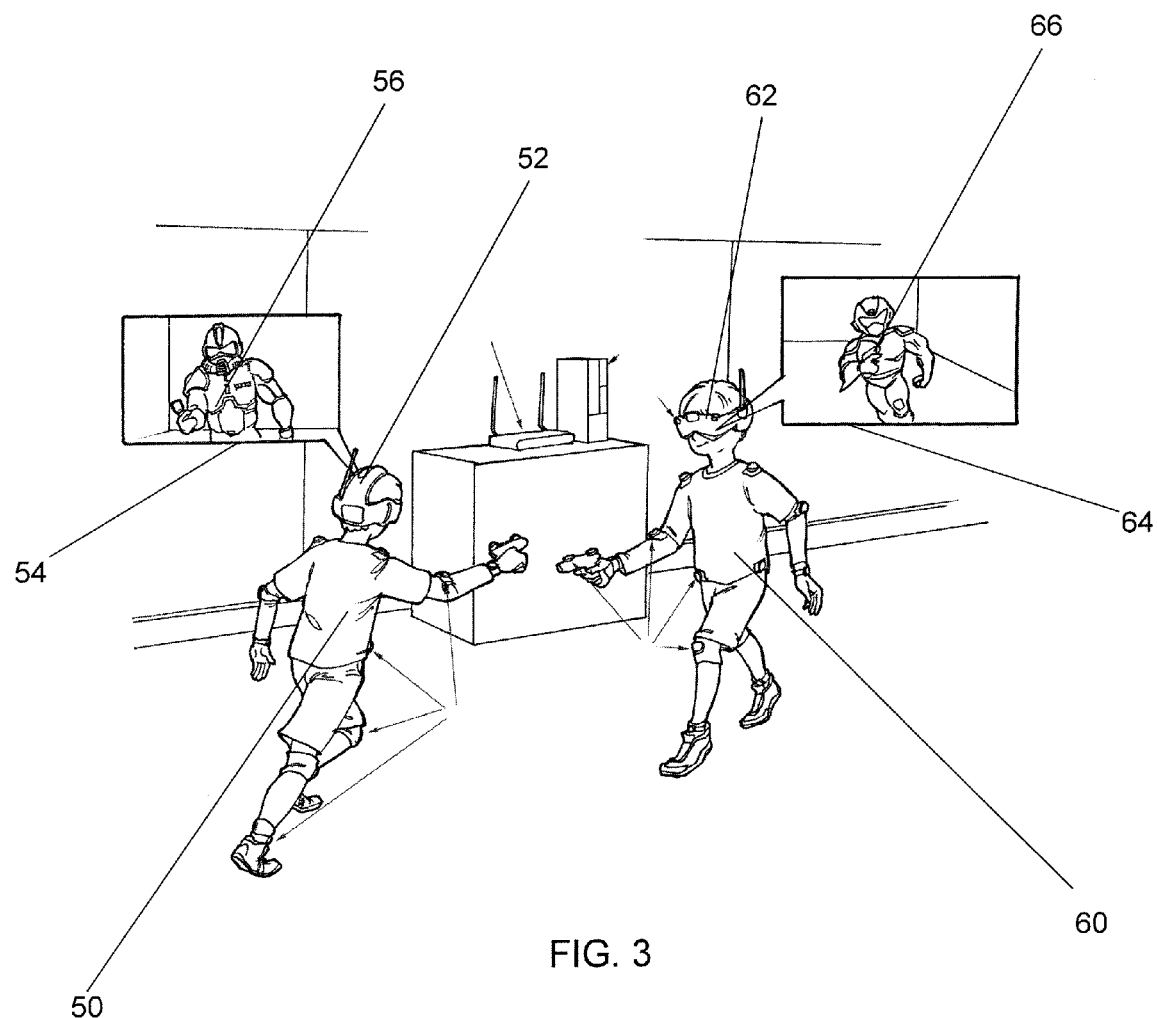
FIG. 3 illustrates another embodiment of the head gear product in use in an environment, different from that illustrated in FIG. 2.

Moreover, in another embodiment, as illustrated in FIG. 3, a first user 50 and a second user 60 are using a first head gear 52 and a second head gear 62, respectively, to interact with each other. First user 50 is wearing a first head gear 52 while looking at a second user 60 who is wearing a second head gear 62. First user 50 views second user 60 through first head gear 52, which displays first image 54. First image 54 displays an augmented second user 56, which is second user 60 being augmented by first head gear 52 to wear a different outfit. Additionally, second user 60 views first user 50 through second head gear 62, which displays second image 64. Second image 64 displays an augmented first user 66, which is first user 50 being augmented by second head gear 62 to wear a different outfit.

FIGS. 7-9 illustrate one embodiment of the head gear 102 being worn on a head 100. Head gear 102 is secured to head 100 via a head band 108. In this embodiment, head band 108 goes around the back of the head 100 and over the top of the head 100. In other embodiments, the head band 108 may only wrap around the back of head 100, or head gear 102 may not contain head band 108. As illustrated in FIG. 8, head gear 102 includes an electronic device compartment 114 with a camera hood 106 disposed on top of electronic device compartment 114. Electronic device compartment 114 is configured to receive an electronic device such as an Apple® iPhone®, or other mobile electronic device with a display and camera. Camera hood 106 is configured to house a camera mirror 70, 80, 90, similar to those illustrated in FIGS. 4-6, described in detail below.

Referring back to FIG. 7, on the front of head gear 102 is a half mirrored surface 104. The half mirrored surface 104 is positioned at an angle with respect to the electronic device 124 (see FIG. 9) and the electronic device compartment 114. This configuration, as illustrated in FIG. 9, enables the electronic device 124 to collect camera images 130 that are reflected to the electronic device 124 by camera hood 106. The configuration then enables the electronic device 124 to display an augmented image 132 of camera image 130 towards half-mirrored surface 104, which then reflects the augmented image 132 to the head 100. This is all done while simultaneously allowing the user to see the environment image 134.

Referring back to FIG. 4, one embodiment of the input member 12 is illustrated as planar mirror or reflective surface 70. The mirror 70 is configured to fit within camera hood 106. In this embodiment, mirror 70 provides redirection of an image 72 into the electronic device 124. An image 72 engages the mirror 70, which reflects image 72 down into the electronic device 124 as image reflection 74. With electronic device 124 positioned horizontally in the head gear 102, mirror 70 acts similar to that of a periscope. As mirror 70 is a flat surface, it provides a view directly in front of head gear 102 for electronic device 124.

Referring to FIG. 5, another embodiment of the input member 12 is illustrated as curved mirror 80. Curved mirror 80 is configured to fit within camera hood 106. In this embodiment, curved mirror 80 provides redirection of images 82 into the electronic device 124 as image reflections 84. The curvature of mirror 80 provides a wider viewing angle for the electronic device 124 as compared to mirror 70. With electronic device 124 positioned horizontally in the head gear 102, curved mirror 80 acts similar to that of a periscope. As curved mirror 80 is a substantially curved surface, it provides a view directly in front of, and to the sides of, head gear 102 for electronic device 124.

Referring to FIG. 6, another embodiment of the input member 12 is illustrated as conical mirror 90. Conical mirror 90 is configured to fit within camera hood 106. In this embodiment, conical mirror 90 provides redirection of images 92 into the electronic device 124 as image reflections 94. As conical mirror 90 is a cone-shaped mirror whose point is directed at the electronic device 124, conical mirror 90 provides the widest viewing angle for the electronic device 124 compared to mirrors 70 and 80. Also, as conical mirror 90 is a substantially curved surface, it provides a 360 degree view for electronic device 124.

Figure 10:
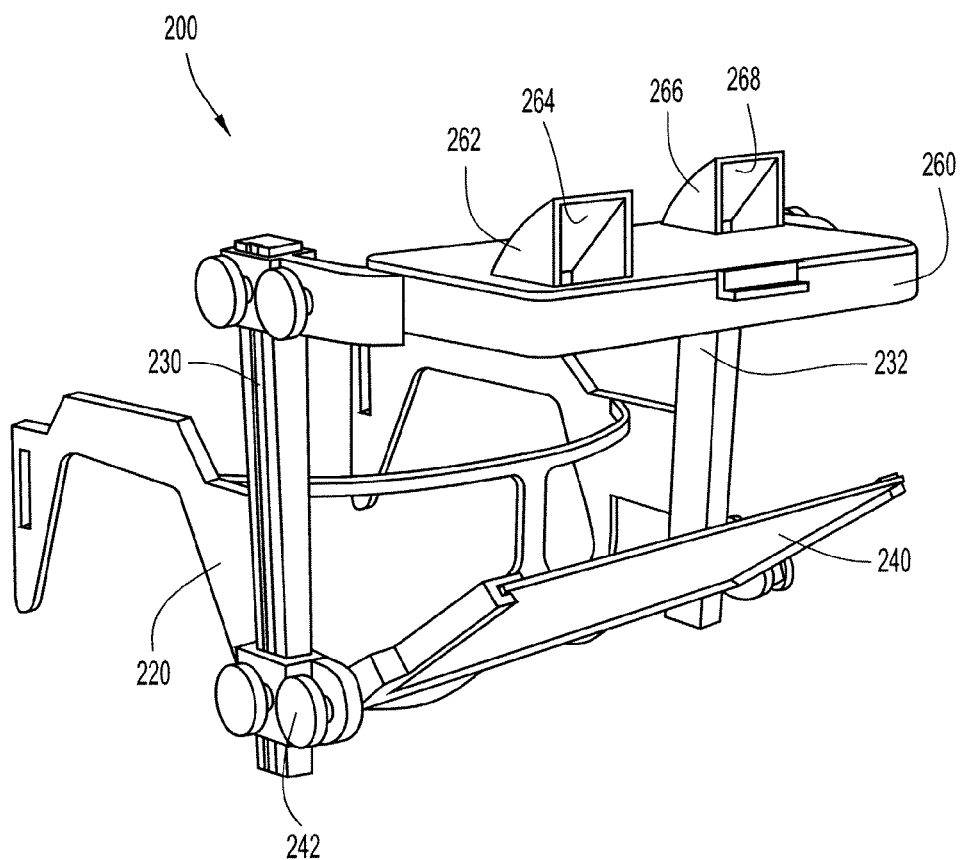
FIG. 10 illustrates a front perspective view of another embodiment of the head gear according to the present invention.

Referring to FIG. 10, another or second embodiment of a head gear 200 according to the present invention is illustrated. As shown, head gear 200 includes a frame 220 that has a first vertical support 230 and a second vertical support 232. Positioned between first vertical support 230 and second vertical support 232 are reflective member 240 and electronic device compartment 260. Reflective member 240 is positioned at the bottom of first vertical support 230 and second vertical support 232 and disposed at an angle relative thereto. Electronic device compartment 260 extends horizontally from the top of first vertical support 230 and second vertical support 232. Electronic device compartment 260 is configured to receive an electronic device 300 such as an Apple® iPhone® or other mobile electronic device with a built-in camera or image capturing capability.

Disposed on top of electronic device compartment 260 is first camera hood 262 and second camera hood 266. First camera hood 262 includes a first camera hood mirror 264, while second camera hood 266 includes a second camera hood mirror 268. As illustrated in FIG. 10, first camera hood 262 is positioned in the front left corner of electronic device compartment 260, and second camera hood 266 is positioned on the rear right corner of electronic device compartment 260. The camera hoods 262, 266 are positioned in these locations because, depending on which orientation the electronic device 300 is placed within the electronic device compartment 260, the camera of the electronic device 300 will align with one of the camera hoods 262, 266.

In another embodiment, the two camera hoods 262, 266 disposed on top of the electronic device compartment 260 are configured to reflect two offset images, one for each eye of the user. Disposed inside the electronic device compartment 260 is a reflective system that would transfer the images from each camera hood 262, 266 to the electronic device 300, which would then display a split screen with the images reflected by each camera hood 262, 266.

Figure 11:
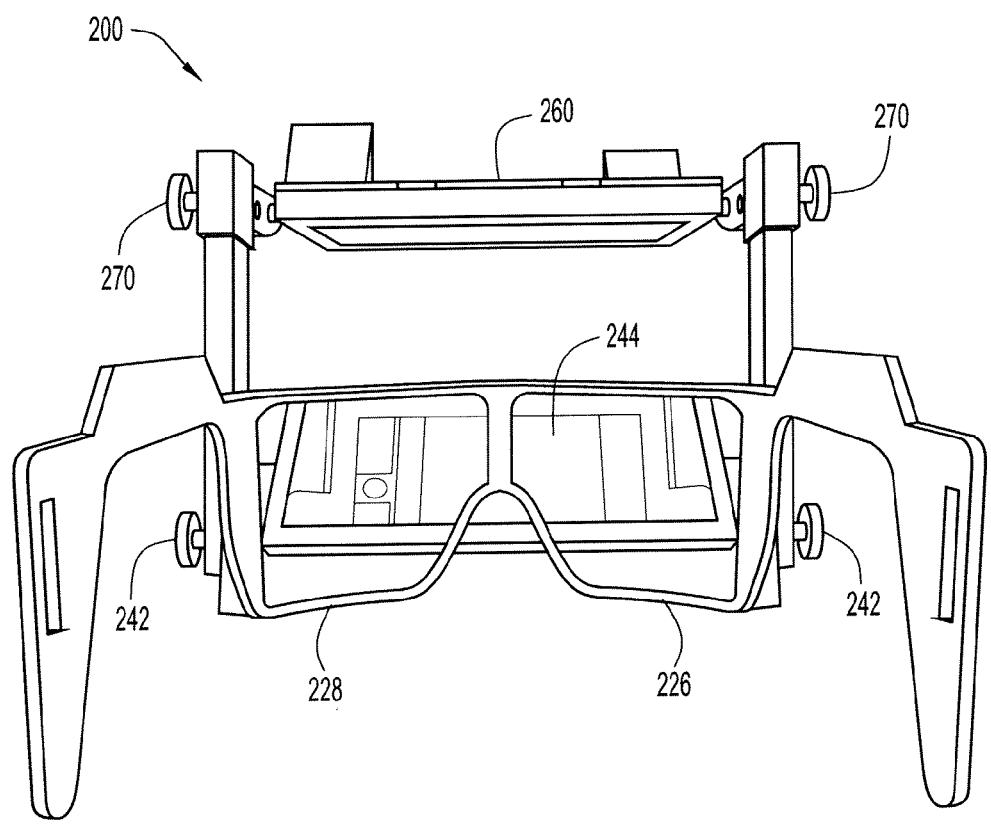
FIG. 11 illustrates a rear view of the head gear illustrated in FIG. 10.

Referring to FIG. 11, a rear view of head gear 200 is illustrated. As shown, electronic device compartment 260 is connected to first vertical support 230 and second vertical support 232 by a pair of hinges 270. In one embodiment, hinges 270 enable electronic device compartment 260 to be pivotally positioned into an optimum image capturing orientation. In addition, reflective member 240 is connected to the first vertical support 230 and second vertical support 232 via hinges 242 (see also FIG. 10). Hinges 242 allow for reflective member 240 to be pivoted into an angled orientation with respect to electronic device compartment 260 to reflect the display of the electronic device 300 to the user's head 280. As illustrated by FIG. 11, electronic device compartment 260 is oriented horizontally with reflective member 240 angled relative to a horizontal plane to reflect the display of the electronic device 300 through first eye member 226 and second eye member 228.

As shown in FIG. 11, first eye member 226 and second eye member 228 are attached to the frame 220 and positioned behind the vertical supports 230 and 232. In this embodiment, the eye members 226 and 228 facilitate alignment of the eyes towards the reflective member 240. In this embodiment, the eye members 226, 228 are shaped similar to those of the frames of eye glasses. In other embodiments, the head gear 200 may not contain any eye members.

Figure 12:
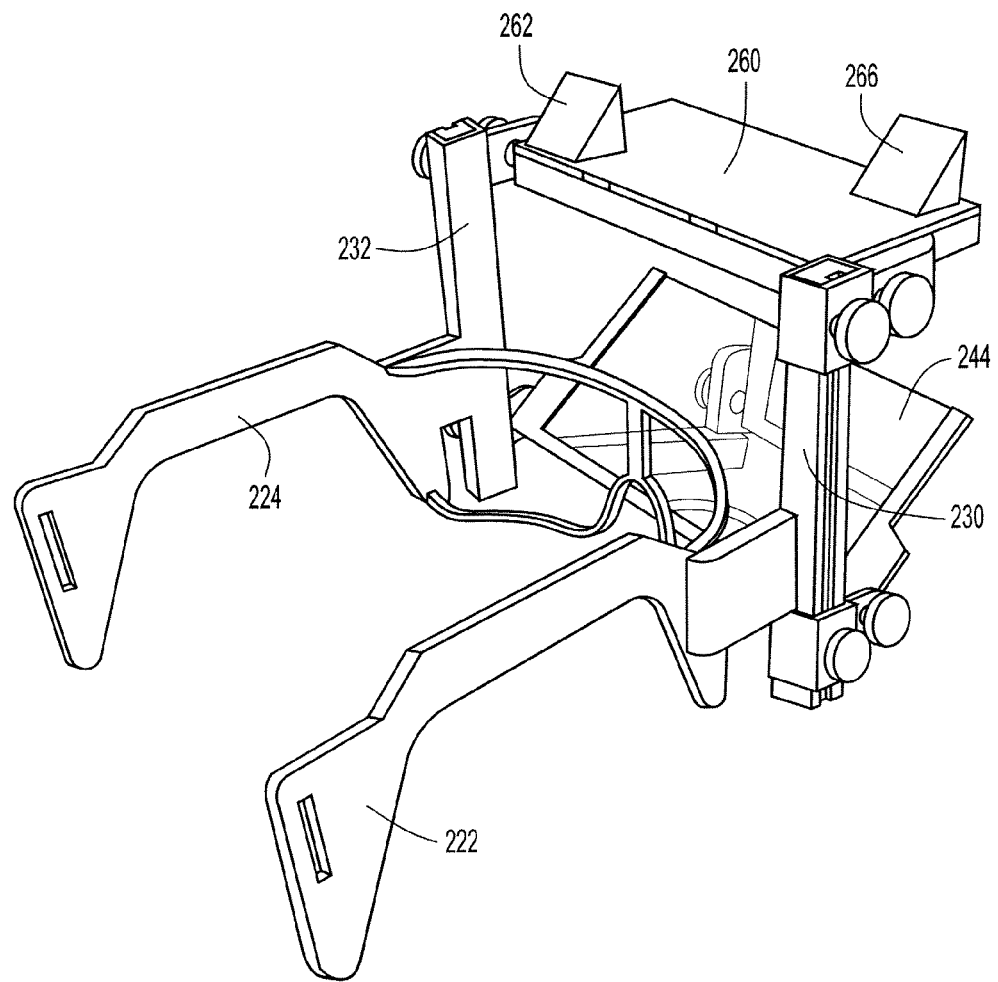
FIG. 12 illustrates a rear perspective view of the head gear illustrated in FIG. 10.
Figure 13:
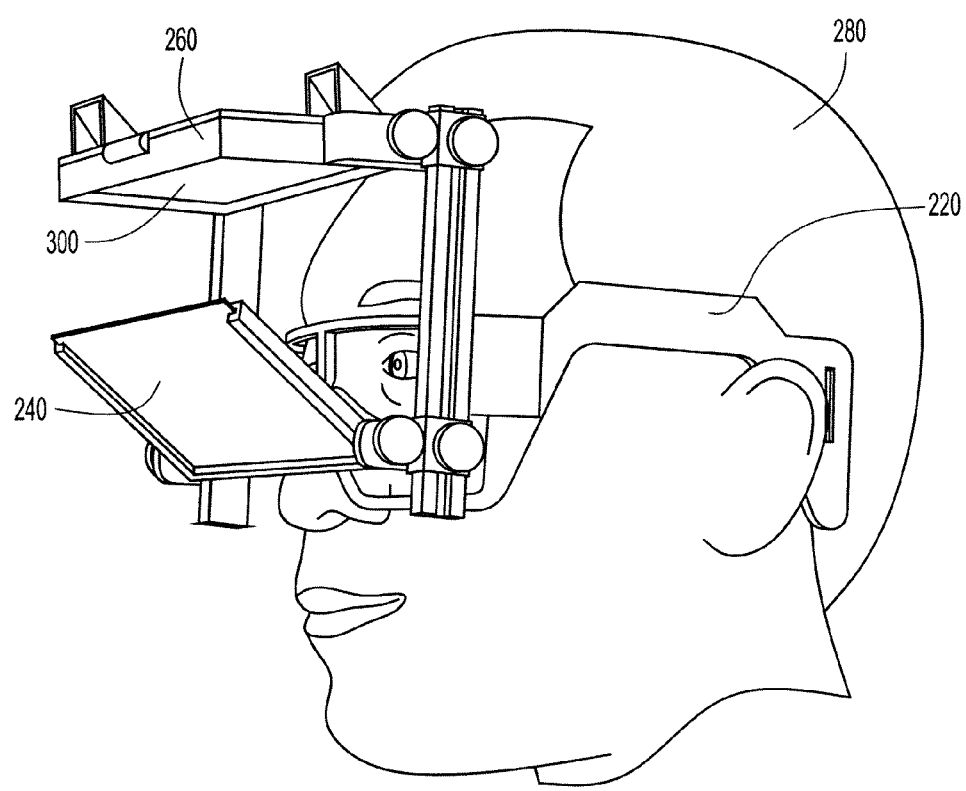
FIG. 13 illustrates a front perspective view of the head gear illustrated in FIG. 10 being worn by a user.

A rear perspective view of the head gear 200 is illustrated in FIG. 12. As shown, head gear 200 includes a first ear member or temple 222 extending towards the rear of head gear 200 from first vertical support 230. Head gear 200 also includes second ear member or temple 224 extending towards the rear of head gear 200 from second vertical support 232. First ear member 222 and second ear member 224 are configured to secure the head gear 200 to a user's head in a manner similar to that of eye glasses, as illustrated by FIG. 13. In this embodiment, the ear members 222, 224 secure the head gear 200 to the head 280 of a user. In other embodiments, other methods of securing a head gear to a head may be used, such as a head band.

Also illustrated in FIG. 12 is the half-mirrored surface 244 of reflective member 240. The half-mirrored surface 244 is configured to reflect the display of electronic device 300 in electronic device compartment 260, while also allowing a user to see through the half-mirrored surface 244 and reflective member 240 to see objects in front of the user. This feature reduces the likelihood that users may trip over or run into objects or other people when using the head gear 200. In other embodiments of the head gear 200, the reflective member 240 may contain a fully reflective member, not allowing a user to see through it, but rather, allowing the user to focus fully on the reflected augmented images. Also shown in FIG. 12 are the compartment 260 and the camera hoods 262 and 266.

Referring to FIG. 13, illustrated is the head gear 200 being worn on the head 280 of a user. As illustrated, the ear members 222, 224 are positioned along the side of the user's head 280 and rest behind the user's ears. Moreover, the eye members 226, 228 align the user's eyes directly with the reflective member 240, which is reflecting the display of electronic device 300 positioned above reflective member 240 by electronic device compartment 260. The alignment is accomplished because portions of the eye members 226, 228 contact and rest on particular portions of the front of the user's head 280, such as the user's nose and/or cheeks. As illustrated by FIG. 13, the frame 220 of head gear 200 is open compared to other embodiments, allowing for peripheral vision by the user of the head gear 200. Other embodiments of head gear 200 may include a frame with sides that are more enclosed, not allowing for any peripheral views.

Referring to FIGS. 14-18, another embodiment of head gear 400 according to the present invention is illustrated. Head gear 400 includes a frame 420 with first side or side member 422 and second side or side member 424. Head gear 400 also includes an electronic device compartment 460 and reflective member 440 that are attached between the sides 422, 424. Electronic device compartment 460 is positioned near the top of sides 422, 424, while reflective member 440 is attached near the bottom of the sides 422, 424. As illustrated, the sides 422 and 424 are wider where the electronic device compartment 460 and reflective member 440 are attached, and are thinner where the sides would extend over the ears on a user's head. Relative to head gear 200 described above, the sides 422 and 424 combined with the electronic device compartment 460 and reflective member 440 make head gear 400 more enclosed than head gear 200. This arrangement allows a user to more fully focus on the augmentation images produced by the electronic device.

Figure 14:
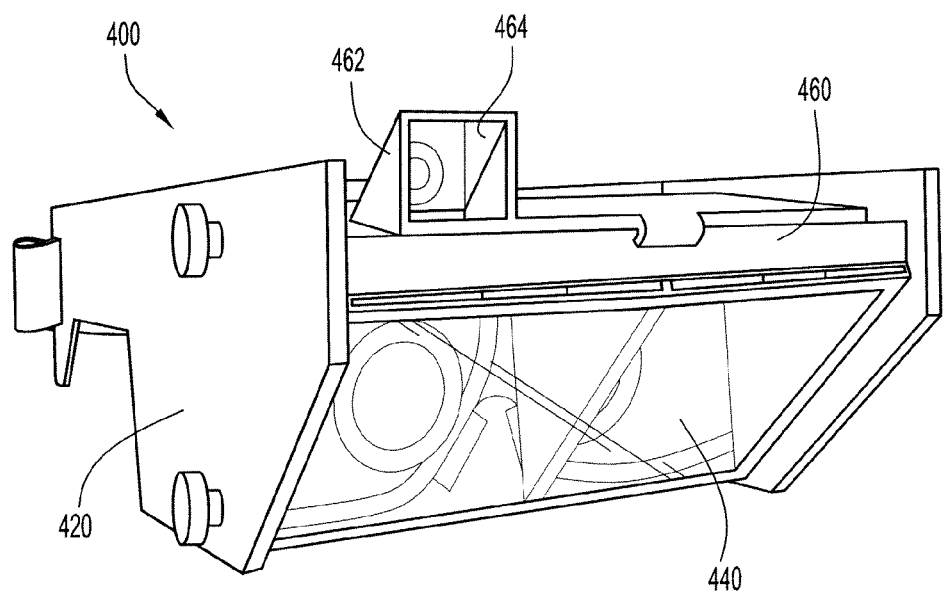
FIG. 14 illustrates a front perspective view of another embodiment of the head gear according to the present invention.

As illustrated in FIG. 14, attached or coupled to the top of electronic device compartment 460 is a camera hood 462 which includes a camera hood mirror 464. The camera hood 462 is positioned on the top of electronic device compartment 460 in the front left corner. This allows for only one orientation of the electronic device 500 within the electronic device compartment 460 because the camera on electronic device 500 must align with the camera hood 462 when the electronic device 500 is positioned within the electronic device compartment 460.

Figure 15:
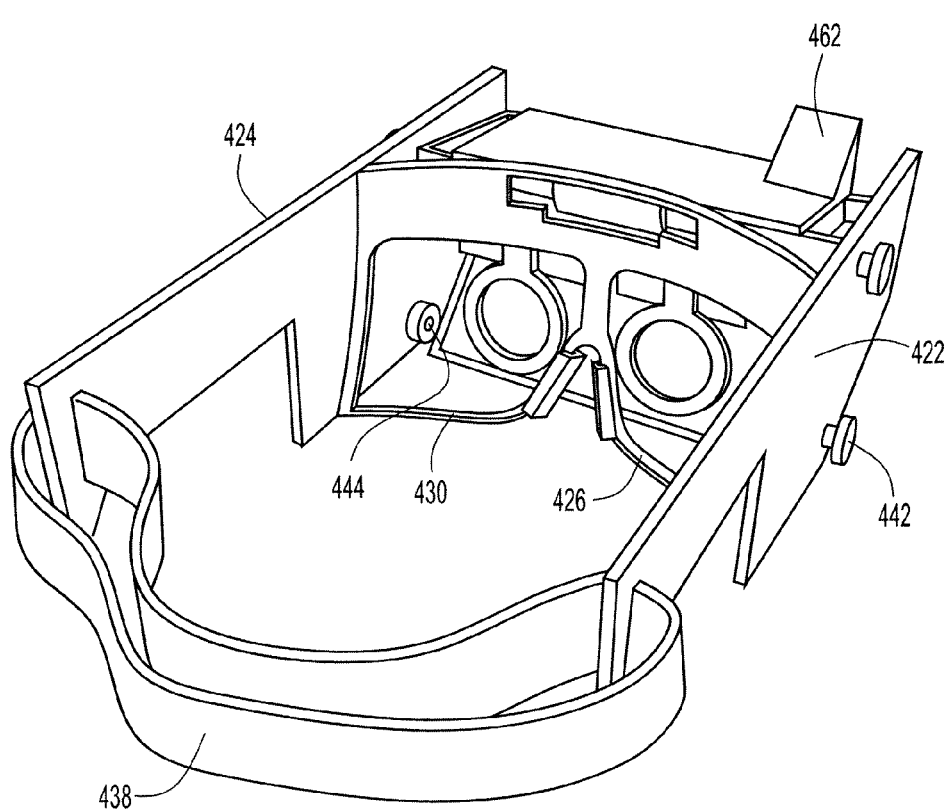
FIG. 15 illustrates a rear perspective view of the head gear illustrated in FIG. 14.

As illustrated by FIG. 15, reflective member 440 is connected to the first side 422 via first hinge 442 and connected to the second side 424 via second hinge 444. First hinge 442 and second hinge 444 enable reflective member 440 to pivot about the hinges 442, 444 to an optimum reflective position with respect to the electronic device compartment 460. Additionally, the hinges 442, 444 enable the reflective member 440 to move between an open position, shown in FIG. 17, and closed position, shown in FIG. 14 when the user wants to take a pause during gameplay without taking off the head gear 400. The head gear 400 also includes first and second eye members 426, 430, which are described in greater detail below.

As illustrated in FIG. 15, the head gear 400 includes a head strap or mounting component 438 on the ends of the first side 422 and second side 424 to secure the head gear 400 to the user's head. Head strap 438 in this embodiment is an elastic band. In other embodiments, the head strap 438 may be an adjustable strap with plastic strap adjusters, a strap with Velcro® hooks and loops fasteners, or a plastic snap strap. In other embodiments, the head gear 400 may not contain a strap and may contain ear members similar to that of eye glasses. 426

Figure 16:
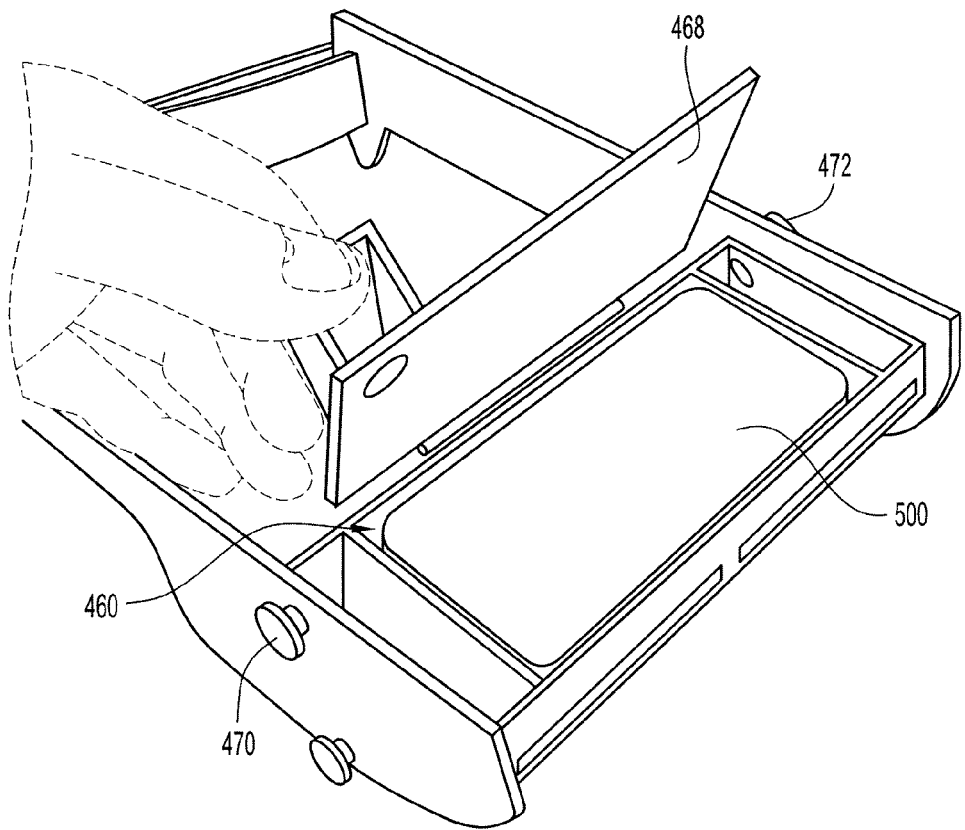
FIG. 16 illustrates a top perspective view of the electronic device compartment of the head gear illustrated in FIG. 14.

Referring to FIG. 16, electronic device compartment 460 is attached to first side 422 via first hinge 470 and connected to second side 424 via second hinge 472. Hinges 470, 472 enable electronic device compartment 260 to be pivotally positioned about hinges 470, 472 into an optimum image capturing orientation for the camera of the electronic device 500 via the camera hood 462.

In this embodiment, the top of the electronic device compartment 460 has a compartment door 468. As illustrated in FIG. 16, with compartment door 468 opened, electronic device 500 can be positioned and secured properly within the electronic device compartment. In other embodiments, the electronic device 500 may be secured within electronic device compartment 460 by a compartment door 468 on the front of the electronic device compartment 460 to allow electronic device 500 to be slid into the electronic device compartment 460 from the front. Furthermore, in another embodiment, electronic device 500 may be secured to electronic device compartment 460 by snap tabs, or other similar securing mechanism.

Figure 17:
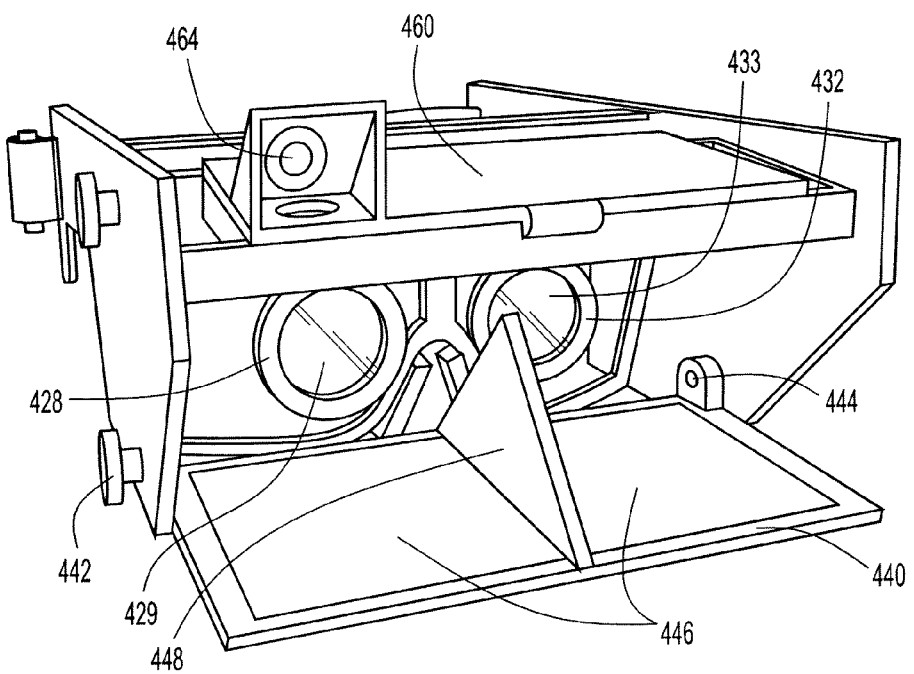
FIG. 17 illustrates a front view of the head gear illustrated in FIG. 14 with the reflective surface placed in an open position.

Referring to FIG. 17, the reflective member 440 is illustrated in a lowered position in which the reflective member 440 has been pivoted via hinges 442, 444 to be substantially horizontal and not in the viewing area of the user. Reflective member 440 includes a half-mirrored surface 446 and a center minor divider 448. The half-mirrored surface 446 is configured to reflect the display of electronic device 500 in electronic device compartment 460, while also allowing a user to see through the half-mirrored surface 446 and reflective member 440 to see objects in front of them.

Moreover, reflective member 440 includes a center mirror divider 448, which is opaque, that allows the user's eyes to focus properly on the appropriate portion of the half-mirrored surface 446, which reflects an augmented image from electronic device 500. An additional feature of the center mirror divider 448 is that the divider 448 allows for electronic device 500 to display two images simultaneously by dividing half-mirrored surface 446 into two sides. In other embodiments, reflective member 440 may not contain a center mirror divider 448.

Figure 18:
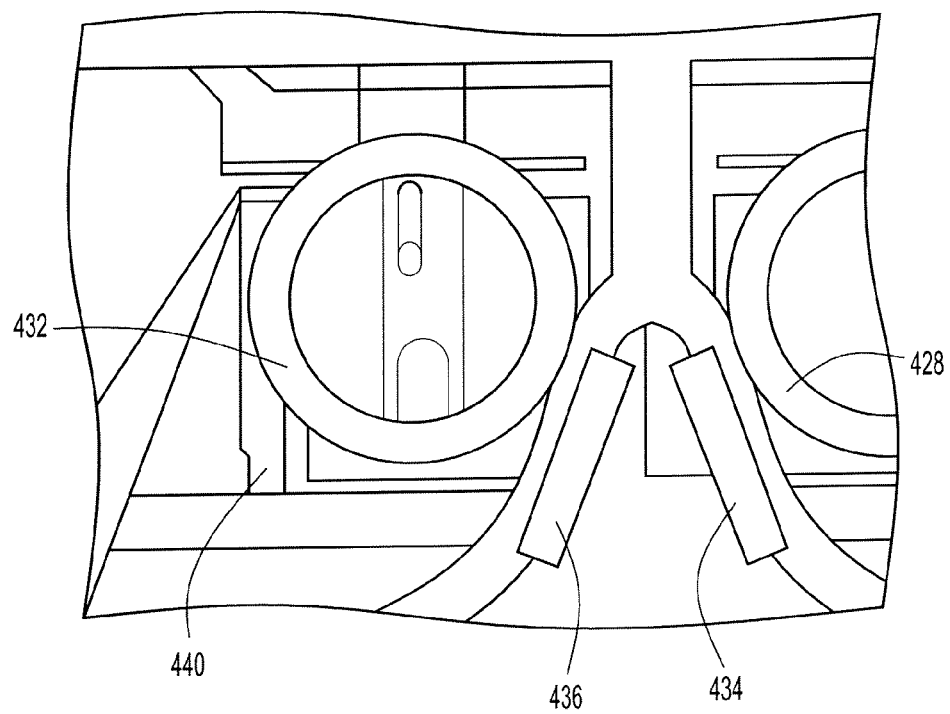
FIG. 18 illustrates a view through the inner eye magnifier or lens of the head gear illustrated in FIG. 14.
Figure 19:
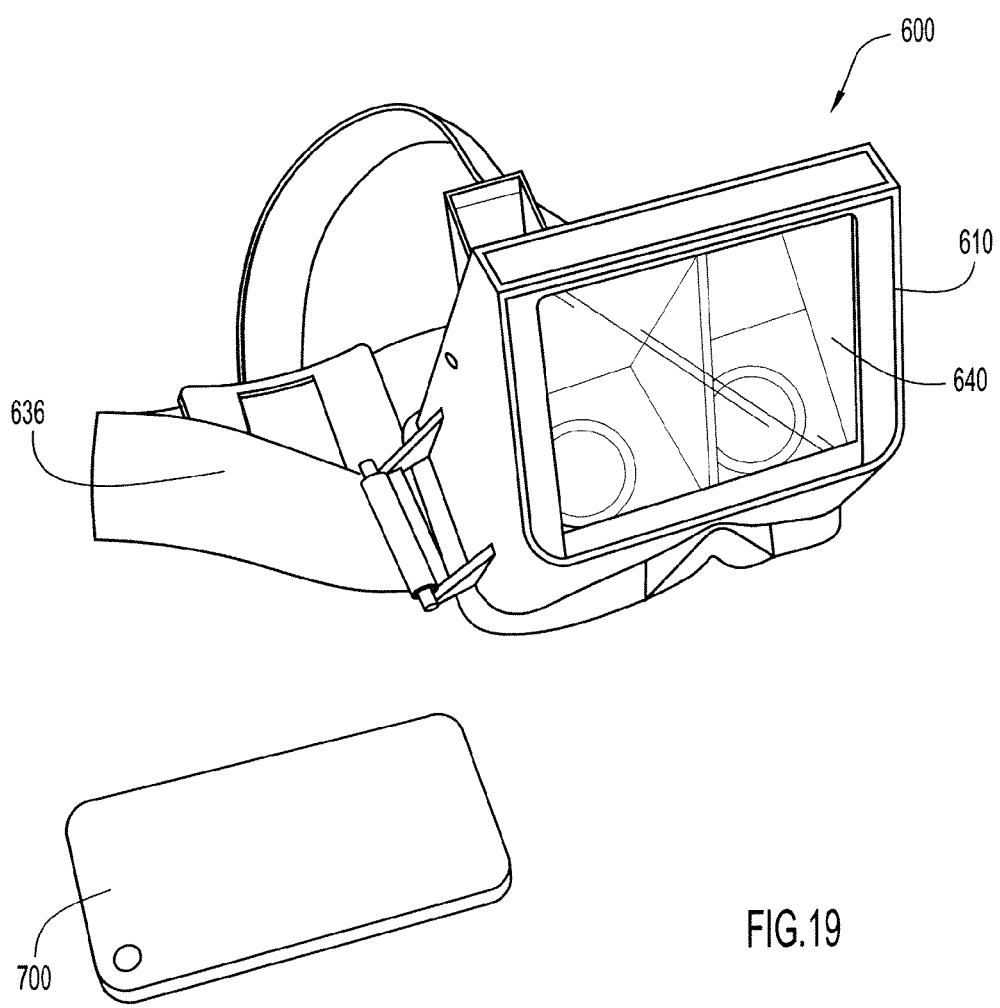
FIG. 19 illustrates a front perspective view of another embodiment of the head gear according to the present invention and a compatible electronic device.

Also illustrated in FIG. 17 are lens frames 428 and 432 that are configured to support lenses 429 and 433, respectively. The view through one of the lenses is illustrated in FIG. 18.

Referring back to FIG. 15, first eye member 426 and second eye member 430 are attached to the frame 420 and positioned behind the reflective member 440. In this embodiment, the eye members 426 and 430 facilitate alignment of the eyes towards the reflective member 440. In other embodiments, the head gear 400 may not contain any eye members. Between first eye member 426 and second eye member 430 is a bridge portion that includes a first nose pad 434 and a second nose pad 436 (see FIG. 18) and that is configured to receive and be supported on a user's nose. Furthermore, as illustrated in FIGS. 15, 17, and 18, first and second eye members 426, 430 contain lenses or inner eye magnifiers 428, 432, respectively. Lenses 428, 432 align with the eyes of the user, and magnify the reflection from the reflection member 440. This allows for the half-mirrored surface 446 to appear larger and in focus. In other embodiments of head gear 400, eye members 426,430 may not contain lenses 428,432.

Referring to FIGS. 19-25, another embodiment of a head gear according to the present invention is illustrated. Head gear 600 is formed from a container or housing 610 with a head strap 636 coupled thereto that is used to mount the head gear 600 on a user's head.

Figure 20:
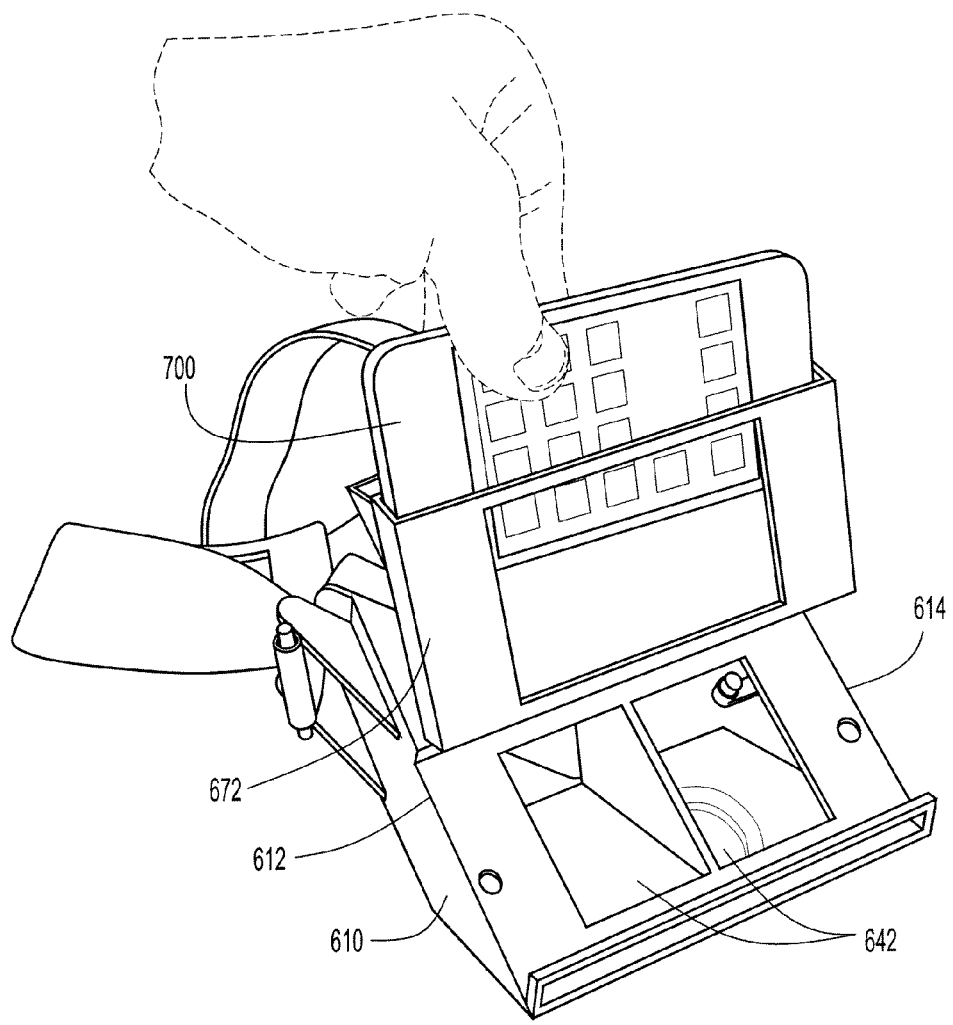
FIG. 20 illustrates a front perspective view of an electronic device being inserted into the electronic device compartment of the head gear illustrated in FIG. 19.

Referring to FIG. 20, housing 610 has a first side 612 and a second side 614. Housing 610 is configured to receive the electronic device 700 and includes an angled reflective surface 640 on the front of the housing 610. The reflective surface 640 is angled with respect to the top and bottom of the housing 610. Compared to head gear 200 and head gear 400, head gear 600 is completely enclosed.

In FIG. 20, the head gear 600 is illustrated with its electronic device container 660 in an open configuration. Electronic device container 660 includes a compartment door 672 which is connected to the container 610 via a hinge. As illustrated, the compartment door 672 is in the open position, and may slidably receive the electronic device 700. Furthermore, with the compartment door 672 in the open position, the half-mirrored surface 642 is positioned below the electronic device compartment 660 to reflect the display of the electronic device 700 to the user. As stated previously, the half-mirrored surface 642 is configured to allow a user to see through the half-mirrored surface 642 and reflective member 640 to see other objects.

Figure 24:
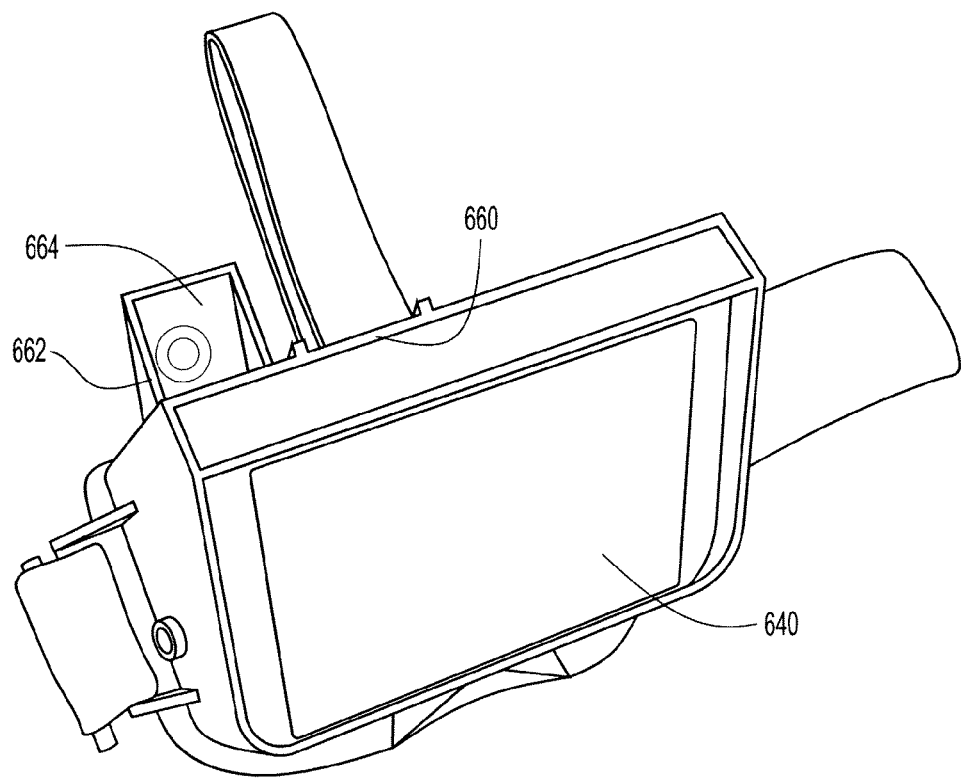
FIG. 24 illustrates a front view of the head gear illustrated in FIG. 19.

Referring to FIG. 24, the electronic device compartment 660 is in communication with a camera hood 662 which includes a minor or reflective surface 664. Camera hood 662 is configured on the top of electronic device compartment 660 so the camera on the electronic device 660 aligns with the camera hood 662. In other embodiments, the electronic device compartment 660 may contain several camera hoods, allowing for more than one orientation of the electronic device 700 within electronic device compartment 660. The reflective surface 640 is also illustrated in FIG. 24.

Referring back to FIGS. 21 and 22, the head gear 600 includes a trigger mechanism 616. In this embodiment, the trigger mechanism 616 includes a trigger 618, an arm 620, and a contact member 622. The trigger 618 is attached to the second side 614 of the container or housing 610 (see FIG. 22). In other embodiments, the trigger 618 may be located on another side of the housing 610, or alternatively, housing 610 may not have a trigger mechanism 616.

In this embodiment, the arm 620 connects the trigger 618 to the contact member 622. The electronic device 700 includes a touch screen or other actuation mechanism, such as a button, with which contact member 622 is aligned. When a user presses or moves the trigger 618, the arm 620 moves contact member 622 to contact the electronic device 700 and in some instances, the touch screen of the device 700. During use of the head gear 600, trigger mechanism 616 allows the user to interact with the electronic device 700 housed within the electronic device compartment 660 by providing inputs to the touch screen during use.

Figure 21:
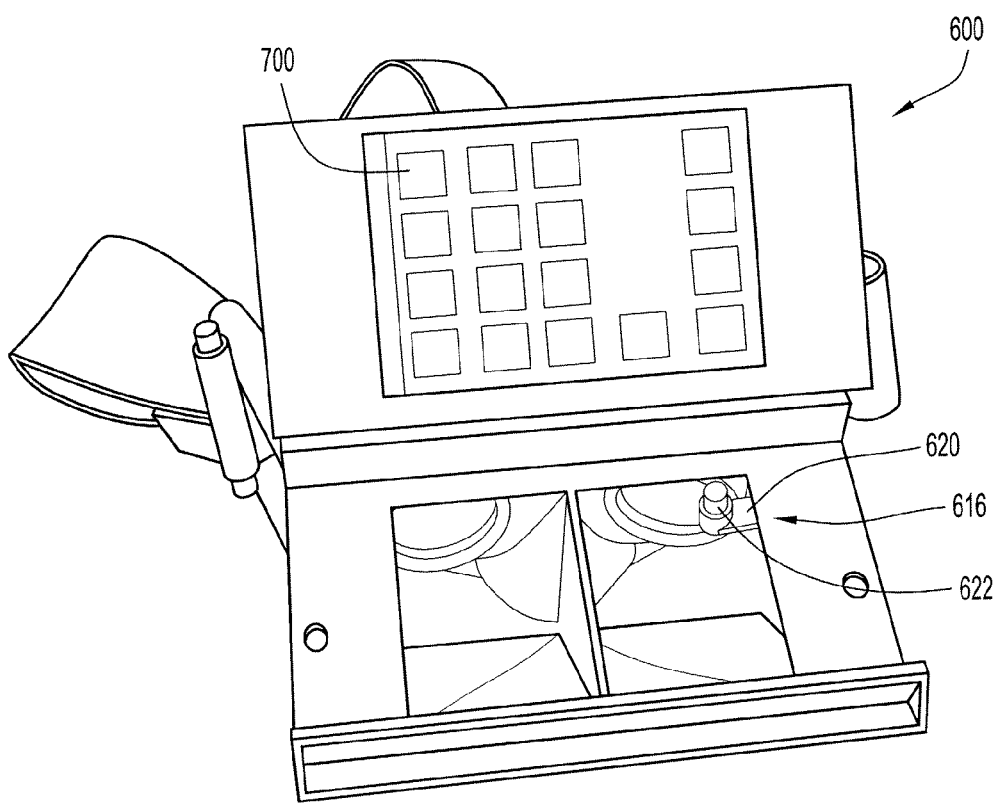
FIG. 21 illustrates a front view of the open position of the head gear illustrated in FIG. 19.
Figure 22:
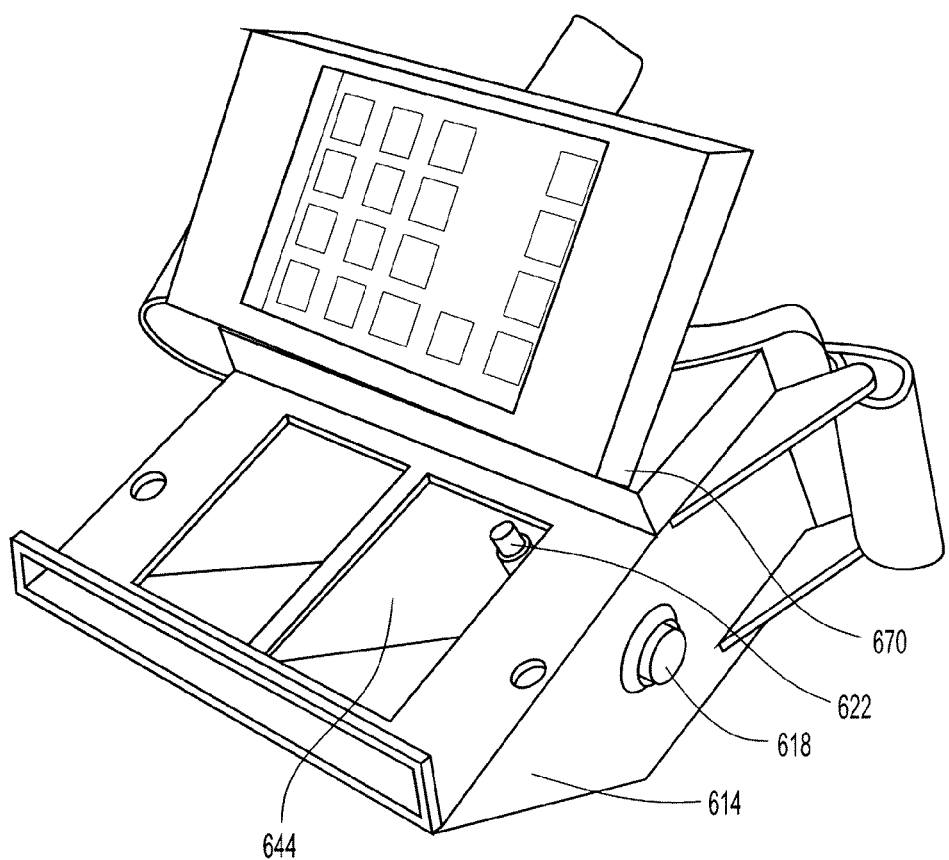
FIG. 22 illustrates a perspective view of the trigger mechanism and the open position of the head gear illustrated in FIG. 21.

Additionally, as illustrated in FIGS. 20-22, reflective member 640 includes a center divider 644. Divider 644 is opaque and disposed to allow the eyes of a user to focus properly on the particular portions of the half-mirrored surface 642, which reflects an augmented image from electronic device 700. The divider 644 allows for the electronic device 700 to display two images simultaneously by dividing surface 642 into two sides or portions. In other embodiments, reflective member 640 may not contain a center divider 644.

Figure 23:
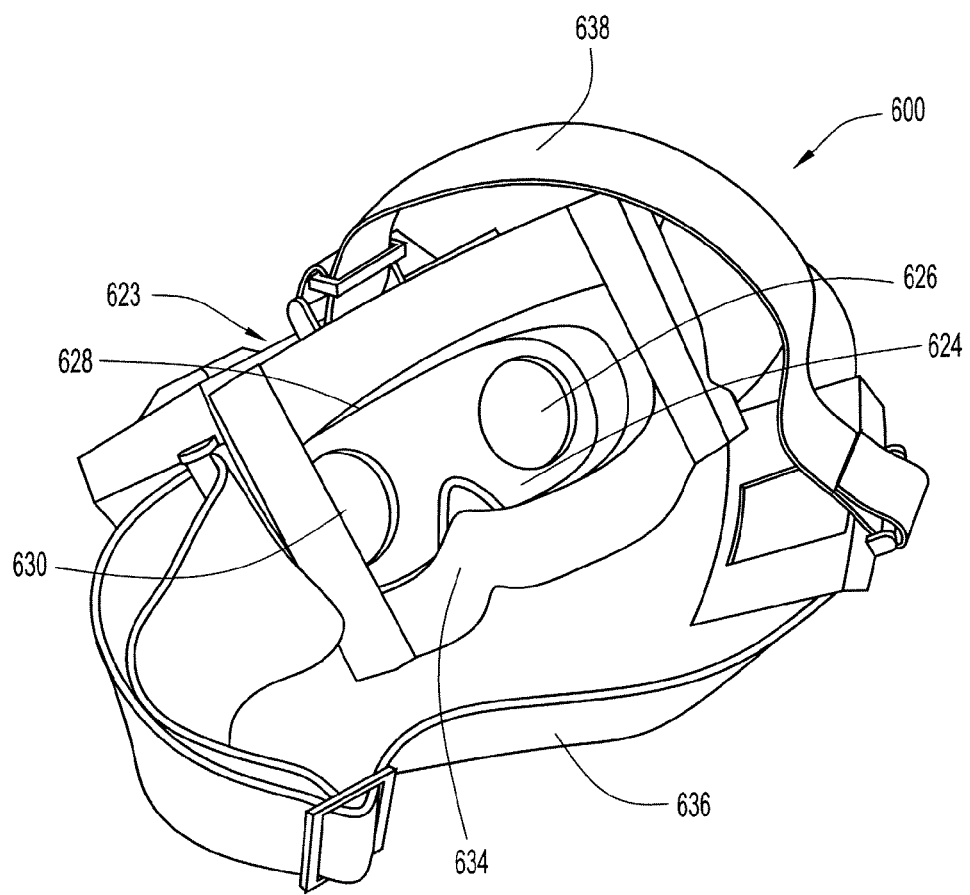
FIG. 23 illustrates a rear perspective view of the head gear illustrated in FIG. 19.

Referring to FIG. 23, a rear view of the head gear 600 is illustrated. Head gear 600 includes a face member 623 compared to individual eye members 226, 228, 426, 430 of previously described embodiments. Face member 623 includes a first eye member 624 and a second eye member 628 which are disposed so as to create a fit on the user's head similar to that of goggles rather than eye glasses. Furthermore, with the eye members 624 and 628 are inner eye magnifiers or lenses 626 and 630. Lenses 626, 630 align with the eyes of the user, magnifying the reflection from the reflection member 640, and permitting the user's eyes to focus on the reflected image. This arrangement results in surface 642 appearing larger. Moreover, face member 623 includes a face pad 634 which provides a comfortable padded fit against the user's head 680. Face pad 634 may be constructed from foam or another similar type of padding. In other embodiments, face member 623 may not contain a face pad 634.

Additionally, FIG. 23 illustrates a head strap 636 connected to first side 612 and second side 614 of the housing 610. In this embodiment, head strap 636 is constructed from an elastic material. In other embodiments, however, the head strap 636 may be an adjustable strap with plastic strap adjusters, a strap with Velcro® fasteners, or a plastic snap strap. Furthermore, attached to housing 610 and head strap 636 is top head strap 638. Top head strap 638 is constructed from similar materials to that of head strap 636, and in this embodiment is constructed of Velcro® fasteners. Top head strap 638 further secures the head gear 600 to the user's head. Top head strap 638 prevents head gear 600 from sliding down on the user's head.

Figure 25:
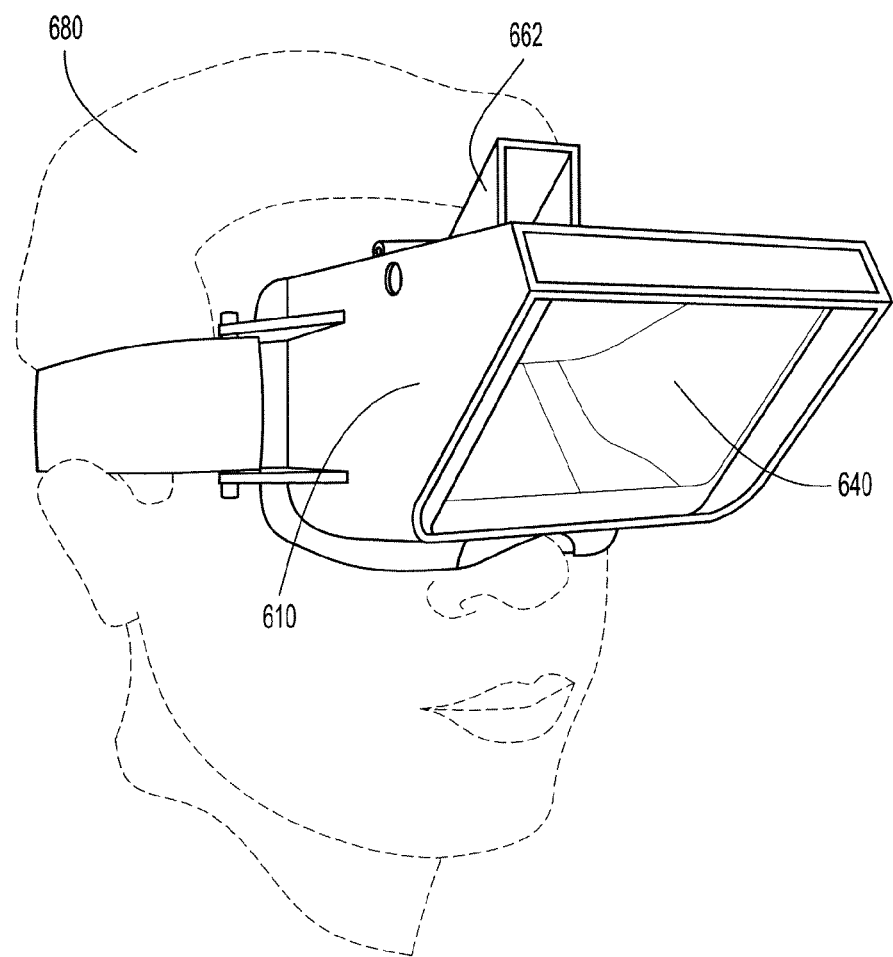
FIG. 25 illustrates a perspective view of the head gear illustrated in FIG. 19 being worn by a user.

Referring FIG. 25, the head gear 600 is illustrated on the user's head. The head strap 636 wraps around the sides of the user's head 680, and top head strap 638 wraps over the top of the head 680. FIG. 25 illustrates that head gear 600 is worn on the head 680 similar to that of goggles.

It is to be understood that terms such as "left," "right," "top," "bottom," "front," "end," "rear," "side," "height," "length," "width," "upper," "lower," "interior," "exterior," "inner," "outer" and the like as may be used herein, merely described points or portions of reference and do not limit the present invention to any particular orientation or configuration. Further, terms such as "first," "second," "third," etc., merely identify one of a number of portions, components, and/or points of reference as disclosed herein, and do not limit the present invention to any particular configuration or orientation.

Although the disclosed inventions are illustrated and described herein as embodied in one or more specific examples, it is nevertheless not intended to be limited to the details shown, since various modifications and structural changes may be made therein without departing from the scope of the inventions. In addition, various features from one of the embodiments may be incorporated into another of the embodiments. Accordingly, it is appropriate that the invention be construed broadly and in a manner consistent with the scope of the disclosure.

What is claimed is:

1. A head set for augmenting the surrounding environment comprising:

a frame having opposed first and second sides, and opposed top and a bottom sides connecting the first side and the second side;

an electronic compartment disposed on the top of the frame;

at least one camera hood disposed on the electronic compartment;

a reflective surface disposed on the frame below the electronic compartment, and a mirrored surface within the camera hood, disposed to enable a camera of an electronic device to capture images of one or more objects placed in front of the head set.

2. The head set of claim 1, further comprising:

a first ear member extending rearwardly from the first side of the frame; and a second ear member extending rearwardly from the second side of the frame.

3. The head set of claim 1, wherein the electronic compartment positions an electronic device to project an image from a display of the electronic device below onto the reflective surface.

4. The head set of claim 3, wherein the reflective surface is angled to reflect the display of the electronic device rearwardly.

5. The head set of claim 1, wherein the reflective surface is a partially-mirrored surface, enabling a user to at least partially view objects through the reflective surface.

6. The head set of claim 1, wherein the at least one camera hood is a first camera hood and a second camera hood.

7. A head set for augmenting the surrounding environment comprising:

a compartment having a top side, a bottom side, a first side, and a second side opposite the first side;

at least one camera hood disposed on the top side of the compartment;

a first frame member coupled to the first side of the compartment;

a second frame member coupled to the second side of the compartment;

a reflective surface disposed between the first frame member and the second frame member, and below the compartment, wherein the reflective surface is angled to rearwardly reflect an image from the compartment, and a mirrored surface within the camera hood, disposed to enable a camera of an electronic device to capture images of one or more objects placed in front of the head set.

8. The head set of claim 7, further comprising:

the first frame member extending rearwardly from the first side of the compartment;

the second frame member extending rearwardly from the second side of the compartment; and a head band connected between the first frame member and the second frame member.

9. The head set of claim 7, wherein the compartment positions an electronic device as to project the display of the electronic device onto the reflective surface.

10. The head set of claim 7, wherein the reflective surface is a partially-mirrored surface, enabling a user to at least partially view objects through the reflective surface.

11. The head set of claim 7, further comprising a first eye member and a second eye member, the first eye member and second eye member are configured to receive a user's face and direct a user's view towards the reflective surface.

12. A head set for augmenting the surrounding physical environment comprising:

a compartment configured to receive an electronic device that augments and displays the surrounding physical environment;

at least one camera hood disposed on the compartment and configured to direct an image capturing device of the electronic device to the surrounding physical environment;

a reflective surface disposed below the compartment and configured to reflect the augmented surrounding physical environment; and a face pad with a first eye member and a second eye member configured to receive a user's face and direct a user's view towards the reflective surface, wherein the reflective surface is configured to an angle with respect to the compartment to reflect the augmented surrounding physical environment through the first and second eye members of the face pad.

13. The head set of claim 12, further comprising:

a minor positioned within the at least one camera hood.

14. The head set of claim 12, wherein the reflective surface is a partially-mirrored surface.

15. The head set of claim 12, further comprising:

a trigger mechanism configured to the compartment to trigger augmentation of the surrounding physical environment.

16. The head set of claim 12, wherein the compartment further comprises a door hingedly connected to the compartment.

17. The head set of claim 12, wherein the reflective surface is hingedly connected to the compartment to configure the optimum reflecting angle.

18. The head set of claim 12, wherein the compartment is hingedly connected to the face pad.

* * * * *

UNITED STATES PATENT AND TRADEMARK OFFICE
CERTIFICATE OF CORRECTION

PATENT NO. : 8,970,960 B2  
APPLICATION NO. : 13/716575  
DATED : March 3, 2015  
INVENTOR(S) : Yu Page 1 of 1

It is certified that error appears in the above-identified patent and that said Letters Patent is hereby corrected as shown below:

In the Specification

Column 2, line 62 change "minor" to --mirror--.
Column 3, line 19 change "minor" to --mirror--.
Column 5, line 16 change "minor" to --mirror--.
Column 5, line 33 change "minor" to --mirror--.
Column 5, line 34 change "minor" to --mirror--.
Column 5, line 35 change "minor" to --mirror--.
Column 5, line 40 change "minor" to --mirror--.
Column 5, line 44, at both occurrences, change "minor" to --mirror--.
Column 5, line 46 change "minor" to --mirror--.
Column 5, line 48 change "minor" to --mirror--.
Column 5, line 51 change "minor" to --mirror--.
Column 5, line 60, at both occurrences, change "minor" to --mirror--.
Column 5, line 61 change "minor" to --mirror--.
Column 6, line 16 change "minor" to --mirror--.
Column 8, line 44 change "minor" to --mirror--.
Column 9, line 39 change "minor" to --mirror--.

In the Claims

Column 12, line 35 change "minor" to --mirror--.

Signed and Sealed this  
Twenty-eighth Day of July, 2015

Michelle K. Lee  
*Director of the United States Patent and Trademark Office*